Figure 3:
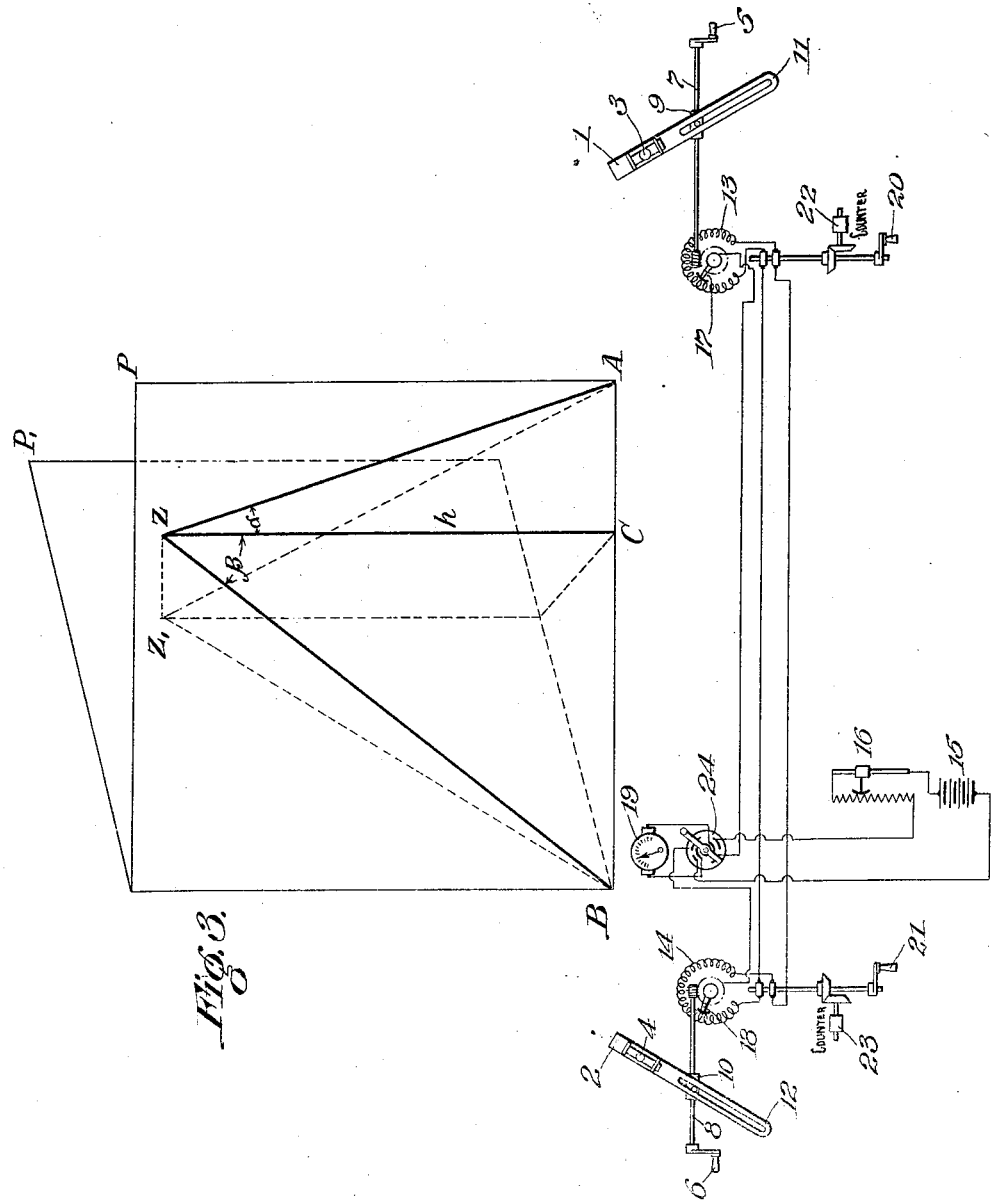

J. L. ROUTIN.
RANGE FINDING METHOD AND APPARATUS.
APPLICATION FILED FEB. 7, 1918.
1,345,706.
Patented July 6, 1920.
2 SHEETS—SHEET 1.
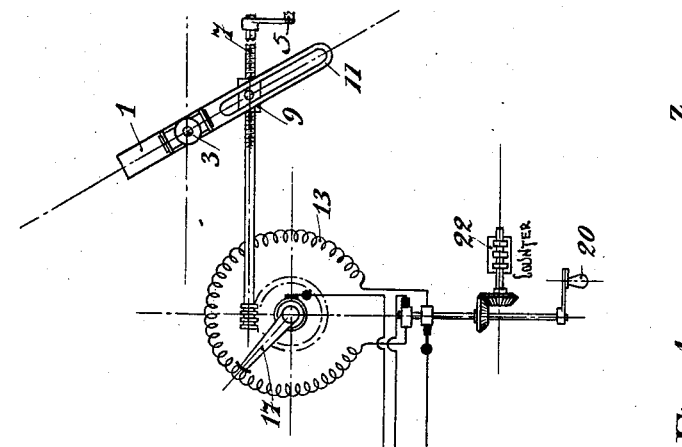
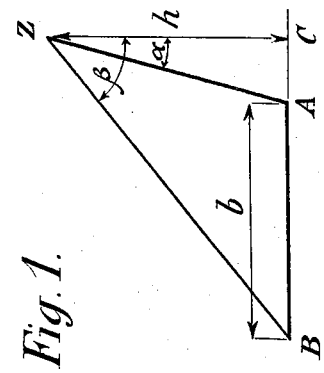
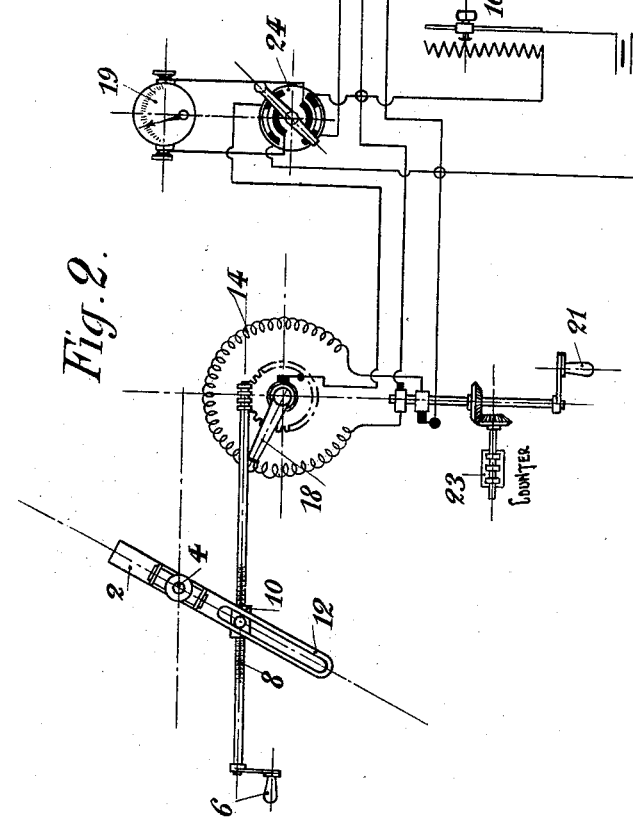
Fig. 1.
Fig. 2.
Inventor.
Joseph Louis Routin
by Mauro, Cameron, Lewis
& Massie, Attorneys J. L. ROUTIN.
RANGE FINDING METHOD AND APPARATUS.
APPLICATION FILED FEB. 7, 1918.

1,345,706.

Patented July 6, 1920.
2 SHEETS—SHEET 2.

Inventor
Joseph L. Routin,
By Mauro, Cameron, Lewis & Massie
Attorneys

UNITED STATES PATENT OFFICE.

JOSEPH LOUIS ROUTIN, OF PARIS, FRANCE.

RANGE-FINDING METHOD AND APPARATUS.

1,345,706.      Specification of Letters Patent.      Patented July 6, 1920.

Application filed February 7, 1918. Serial No. 215,932.

*To all whom it may concern:*

Be it known that I, JOSEPH LOUIS ROUTIN, a citizen of the French Republic, and a resident of No. 2, Rue Olchanski, Paris, France, have invented new and useful Improvements in Range-Finding Methods and Apparatus, which invention is fully set forth in the following specification.

The present invention relates to a system for determining the elevation of an aerial object above the plane of the battery firing from observations made at two near-by stations without calculations. When the elevation is once known, the range may be readily found in terms of the altitude and angle of sight.

Reference being made to the annexed drawings, in which Figure 1 represents a diagram hereinafter explained. Fig. 2 is a diagrammatic representation of the apparatus at the two stations, and Fig. 3 is a schematic view showing the manner of using the apparatus.

Consider the vertical plane P which passes through the horizontal line AB, Figs. 1 and 3, and let Z be the projection of the objective $Z_1$ on this plane, $Z_1$ being in the plane of sight $P_1$.

Let the vertical $h$ denote the height ZC of the triangle ABZ and $\alpha$ and $\beta$ the angles made by the directions ZA and AB with ZC.

For a battery situated at any point, the distance of the objective is known as soon as $h$ is known. Since BC=$h$ tan $\beta$, and AC=$h$ tan $\alpha$, BC—AC=$h$ (tan $\beta$—tan $\alpha$), or $$h = \frac{b}{\tan \beta - \tan \alpha}.$$

The problem is thus reduced to the determination of the value of the difference $d$=tan $\beta$—tan $\alpha$. It would be scarcely practical or advisable to try to determine $d$ by measuring separately tan $\beta$ and tan $\alpha$, but it is possible, as is about to be shown, to obtain directly and very precisely the value of their difference.

In Fig. 2, which represents the mechanism at the two posts 1 and 2, are two telescopes provided with hair-crosses and so mounted that the angles $\alpha$ and $\beta$ on the vertical plane formed by the projections BZ and AZ, Figs. 1 and 3, thereon of lines $BZ_1$ and $AZ_1$ with the vertical $h$, are measured by the rotation of the eye pieces around their optical axles which project at 3 and 4.

Crank handles 5 and 6 serve to rotate the telescopes by causing the longitudinal displacement along the screws 7 and 8 of the nuts 9 and 10 which loosely engage slotted arms 11 and 12 attached to the telescopes pivoted at 3 and 4 respectively.

13 and 14 are two potentiometers fed in parallel by a battery 15.

16 is a rheostat which serves to regulate the tension at which the potentiometers are fed.

17 and 18 are two movable contacts displaced by the cranks 5 and 6 proportionally to the tangents of the angles $\alpha$ and $\beta$ and are connected to the terminals of the voltmeter 19 through switch 24.

20 and 21 are two cranks which enable the potentiometers 13 and 14 to be rotated in relation to the contacts 17 and 18 respectively.

22 and 23 are two counters which register the number of rotations performed by the cranks 20 and 21.

Switch 24 allows of ascertaining the tension at the terminals of the potentiometers by utilizing the voltmeter 19.

It will therefore be seen that, in order to obtain at the voltmeter 19 a tension which may be at each moment proportional to $d$, it will be sufficient to keep the potentiometers 13 and 14 in corresponding positions, care being taken to turn them simultaneously for half a revolution when one of the contacts 17 and 18 reaches the neighborhood of the extremities. This operation is controlled by telephoning from one post to the other the indications of the counters 22 and 23. The voltmeter 19 will, moreover, be so graduated as to give directly not $d$, but the altitude $h$. In order to eliminate errors of aim, it would be advisable to employ a very strongly deadened apparatus or, better still, a recording apparatus. In order to increase the corrections of the readings, the apparatus will moreover be so constructed as to permit of the scale being modified according to the altitude of the objective.

It is easy to give evidence of the advantage presented by the use of potentiometers with two different driving gears.

Suppose, for instance, that we take $b$=200 meters and that we endeavor to measure $h$ between 1000 and 5000 meters, for objectives which can be projected horizontally at a distance of 10 kilometers. If the screw 7 is arranged at a distance of 6 centimeters from the axle 3, the nut 9 must be able to move ±60 cm. The difference $d$ will then remain comprised between: $\frac{200}{1000}$ and $\frac{200}{5000}$ = $\frac{40}{1000}$ which will correspond, for the nuts 9 and 10, to the relative displacements of 12 mm. and 2.4 mm.

The apparatus should be so constructed that when the nut 9 is moved 12 mm., the contact 17 makes at the most 1/2 a revolution. Assuming 10 to remain at rest, a 1 mm. displacement of the nut 9 will then cause the voltmeter 19 to show a variation of 1/24 of the total tension, while with a fixed potentiometer this variation would have been only 1/1200 or 50 times less.

By replacing the angular telescopes by straight telescopes suitably arranged, the device just described also allows of measuring the distances of any objective situated on land or sea.

Thus it will be seen that the invention essentially consists in producing an altitude telemeter by utilizing a voltmeter fed by two potentiometers with two different actuating means for measuring the difference of the tangents of the angles which the vertical makes with the planes of aim perpendicular to the base which connects the two observation posts.

What is claimed is:—

1. The method of determining the altitude of an aerial objective from two stations in accordance with the described formula $$\frac{b}{\tan \beta - \tan \alpha}$$

consisting in projecting the angles of sight of said objective from said stations upon a vertical plane common to said stations to obtain angles $\beta$ and $\alpha$ and controlling the movements of an indicating element in proportion to the difference of the tangents of $\beta$ and $\alpha$ to indicate said altitude.

2. In a system for determining the altitude of an aerial objective from two stations in accordance with the formula $$h = \frac{b}{\tan \beta - \tan \alpha},$$

aiming devices located at the two stations, a source of potential, potentiometers having resistance elements connected with said source in parallel, and each provided with a movable contact, power connections between said aiming devices and said contacts adapted to displace the latter in proportion to tan $\beta$ and tan $\alpha$ respectively, and a voltmeter connected between said contacts giving indications proportional to the difference between tan $\beta$ and tan $\alpha$.

3. In a system as defined in claim 2 wherein means are provided at each station for moving the resistance element of the potentiometer relatively to its contact and for registering each movement whereby the potentiometers may be brought into corresponding positions after one of the contacts reaches the extremity of its resistance element.

In testimony whereof I have signed this specification.

JOSEPH LOUIS ROUTIN.

Witnesses:
HENRI MONIN,
CHAS. P. PRESSLY.